United States Patent
Tai et al.

[11] Patent Number: 6,060,849
[45] Date of Patent: May 9, 2000

[54] CURRENT CONTROL SYSTEM FOR AN ELECTRIC MOTOR

[75] Inventors: Gene Tai; Vincent Lin, both of Hsin-Chu, Taiwan

[73] Assignee: Mustek Systems Inc., Hsinchu, Taiwan

[21] Appl. No.: 09/252,672

[22] Filed: Feb. 19, 1999

[51] Int. Cl.[7] .................................. H02P 7/28; H02P 8/14
[52] U.S. Cl. ........................ 318/432; 318/268; 318/514; 318/696
[58] Field of Search ...................... 388/900, 907, 388/907.5; 318/430, 432, 433, 508, 509, 514, 515, 268, 685, 696

[56] References Cited

U.S. PATENT DOCUMENTS

| | | | |
|---|---|---|---|
| 3,815,001 | 6/1974 | Jamieson | 318/139 |
| 4,225,812 | 9/1980 | Kraus | 318/473 X |
| 4,458,185 | 7/1984 | Matty et al. | 318/270 |
| 4,520,279 | 5/1985 | Glennon | 318/75 |
| 4,992,709 | 2/1991 | Griffin | 318/249 |
| 5,267,835 | 12/1993 | Schabdach et al. | 417/32 |
| 5,323,095 | 6/1994 | Kumar | 318/376 |

*Primary Examiner*—Bentsu Ro

[57] ABSTRACT

A current control system for electric motor is disclosed. The system includes a controller, switches, and resistors. The system is located between the power source and the motor. These resistors are in series with the motor and in parallel to each other. These resistors are employed to change the total resistance between power source and motor, and the current is adjusted when the total resistance is changed. Each a specific resistance value is applied to adjust current, and the specific resistance value is provided by variety number(s) resistors. The controller controls all switches that connect to resistors. According to the working condition of motor, controller chooses corresponding resistors to adjust current. The current consumed by electric motor is varied in different case, but the net consumed current of motor and resistors is controlled and fixed in a predetermined region. In addition, the selection from among resistors must balance the requirements of control current quantity and provide motor enough power.

13 Claims, 6 Drawing Sheets

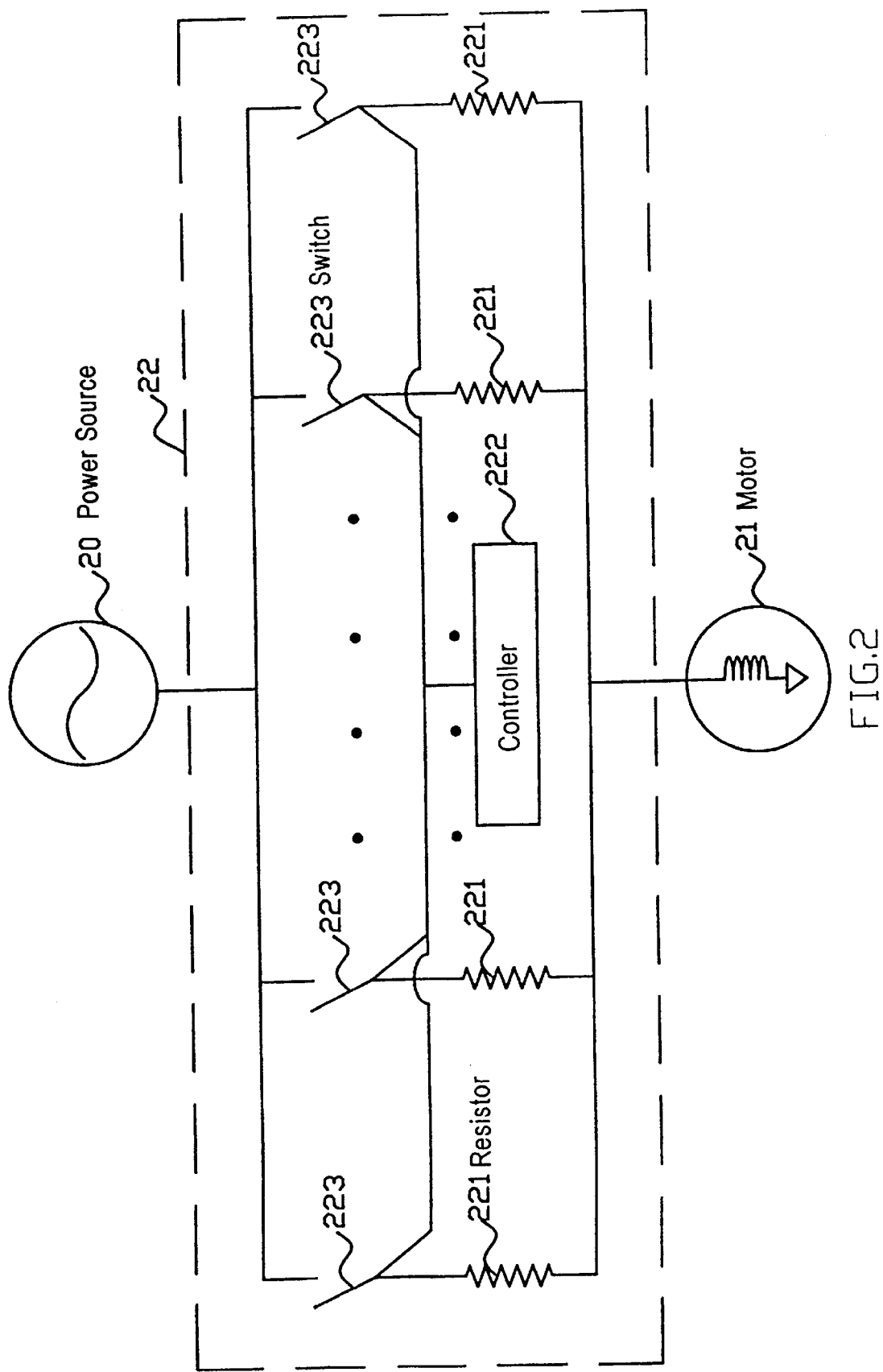

| Resistance Value | State of Switch 1 | State of Switch 2 | State of Switch 3 | State of Switch 4 |
|---|---|---|---|---|
| $R1$ | ON | OFF | OFF | OFF |
| $R2$ | OFF | ON | OFF | OFF |
| $R3$ | OFF | OFF | ON | OFF |
| $R4$ | OFF | OFF | OFF | ON |
| $\left(\frac{1}{R1}+\frac{1}{R2}\right)^{-1}$ | ON | ON | OFF | OFF |
| $\left(\frac{1}{R1}+\frac{1}{R3}\right)^{-1}$ | ON | OFF | ON | OFF |
| $\left(\frac{1}{R1}+\frac{1}{R4}\right)^{-1}$ | ON | OFF | OFF | ON |
| $\left(\frac{1}{R2}+\frac{1}{R3}\right)^{-1}$ | OFF | ON | ON | OFF |
| $\left(\frac{1}{R2}+\frac{1}{R4}\right)^{-1}$ | OFF | ON | OFF | ON |
| $\left(\frac{1}{R3}+\frac{1}{R4}\right)^{-1}$ | OFF | OFF | ON | ON |
| $\left(\frac{1}{R1}+\frac{1}{R2}+\frac{1}{R3}\right)^{-1}$ | ON | ON | ON | OFF |
| $\left(\frac{1}{R1}+\frac{1}{R2}+\frac{1}{R4}\right)^{-1}$ | ON | ON | OFF | ON |
| $\left(\frac{1}{R1}+\frac{1}{R3}+\frac{1}{R4}\right)^{-1}$ | ON | OFF | ON | ON |
| $\left(\frac{1}{R2}+\frac{1}{R3}+\frac{1}{R4}\right)^{-1}$ | OFF | ON | ON | ON |
| $\left(\frac{1}{R1}+\frac{1}{R2}+\frac{1}{R3}+\frac{1}{R4}\right)^{-1}$ | ON | ON | ON | ON |

FIG. 4B

CURRENT CONTROL SYSTEM FOR AN ELECTRIC MOTOR

BACKGROUND OF THE INVENTION

1. Field of the Invention

The present invention relates to a current control system, and particularly to a control system with operation of selecting resistors.

2. Description of the Prior Art

An electric motor uses current power to provide assist torque and drive machines. The motor is generally connected to the machine with a shaft. In utilization, power is applied to revolve the shaft and the shaft then drives the machine. Because of inertia, the higher the rotation frequency is the less torque is required to rotate the shaft, so the motor requires less current to provide torque. The qualitative relationships between these three variables are shown in FIG. 1A and FIG. 1B. It is obvious that the machine needs different torque in different working regions, so the current power used by the motor also is varied in different working regions. If the motor does not share its power source with other devices, the varied requirement of current only affects the working condition of the power source. However, if the motor shares power source with other equipment, the varied power requirement will affect other equipment, changing the power quantity they can use. An obvious example is that the constant current source is shared by an electrical motor and other machines. When the variation of consumed current of the motor is too large, the others may lack current and loss their ability to work stably and efficiently.

In contemporary electric industry, the system minimization tendency increases the probability that electric motor shares its power source with other equipment and the power source is possibly fixed on a limited voltage or current. For example, the universal series bus (USB) is a new interface for the computer and all peripherals connected through the USB to the computer share a common constant current and fixed voltage source. In these systems, the variation of the consumed current of the motor will significantly affect the stability of the whole system. Therefore, this problem must be solved.

SUMMARY OF THE INVENTION

In accordance with the present invention, a current control system for an electric motor is provided that substantially improves the problem that motor consumed current varies in different working regions. Furthermore, the provided invention is non-complex and feasible since only resistors, switches, and a controller are necessary.

In one embodiment, the current control system is used in a scanner to control the motor that drives the light source through the scanning region. The system includes a number of resistors, a number of switches, and a controller that decides which switches are turn on and which resistors are used in each of different working regions that corresponds to a specific scanning mode. Because the power source supports both the motor and other elements of scanner, the current quantities used by the motor in different working regions will influence the current quantities that other equipment can use. There are two problems that may occur, one is the motor consumes too many current so that other equipment lacks current to work, the other is, on the contrary, that other equipment consumes too much current so the motor cannot produce enough torque to work. Those problems are treated by the proposed invention where a plurality of resistors are connected in parallel to each other and current from the power source to the motor must flow through at least one of these resistors. All resistors connect to switches, a controller controls all switches to open or close and then decides which resistors are applied to conduct current. Because the number of used resistors may be zero, one or more, there are a plurality of groups of used resistors. Each specific group includes a variety of number(s) of specific chosen resistors, so the number of groups is larger than the number of resistors. Each resistor corresponds to a specific resistance value and each specific group also corresponds to a specific resistance value. Those specific resistance values are predetermined by experiment to adjust the total resistance between the motor and power source. According to the signal from other equipment, the controller judges the working condition and decides which switches should be turn on and which resistors should be selected to adjust the current quantity. By the selection of resistors, the total resistance is restricted in a fixed region. The current consumed by the motor is thus restricted and the variation of current will be controlled.

In another embodiment according to the present invention, the computer provides current power through the universal series bus (USB), a constant current and constant voltage power source, to a scanner that includes a step motor. The current control system includes an application specific integrated circuit (ASIC), a transistor, and a resistor. The ASIC receives signals from the computer and decides the corresponding working condition of the step motor. When the frequency of the motor is low, the ASIC will also decide whether to increase the total resistance of the step motor and resistor. If it is necessary then the ASIC send a signal to the transistor and set it off, and then the resistor is chosen to adjust the total resistance and the current quantity used by the step motor.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 is a schematic diagram showing the basic structure of a current control system according to this invention;

FIG. 4B illustrates a relationship between states of switches and net resistance value of selected resistors, which corresponding to same special case.

DESCRIPTION OF THE PREFERRED EMBODIMENT

Figure 1A:
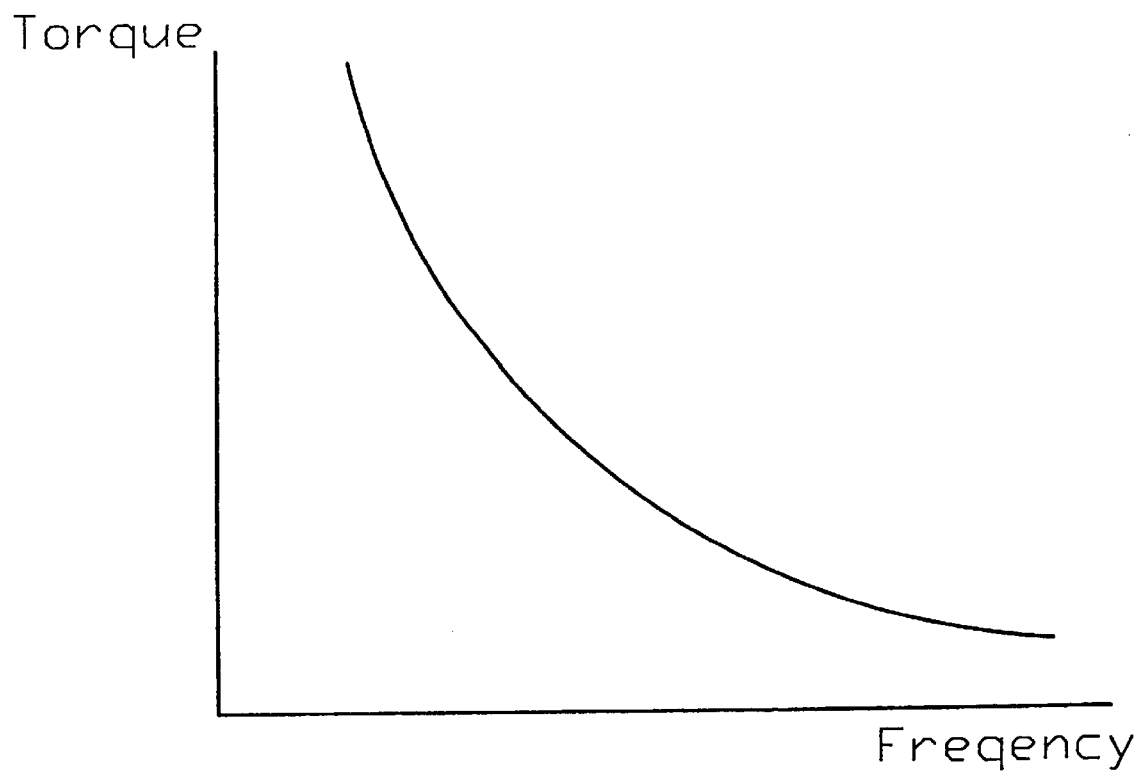
FIG. 1A illustrates a brief qualitative relationship between torque and frequency of a general motor.
Figure 1B:
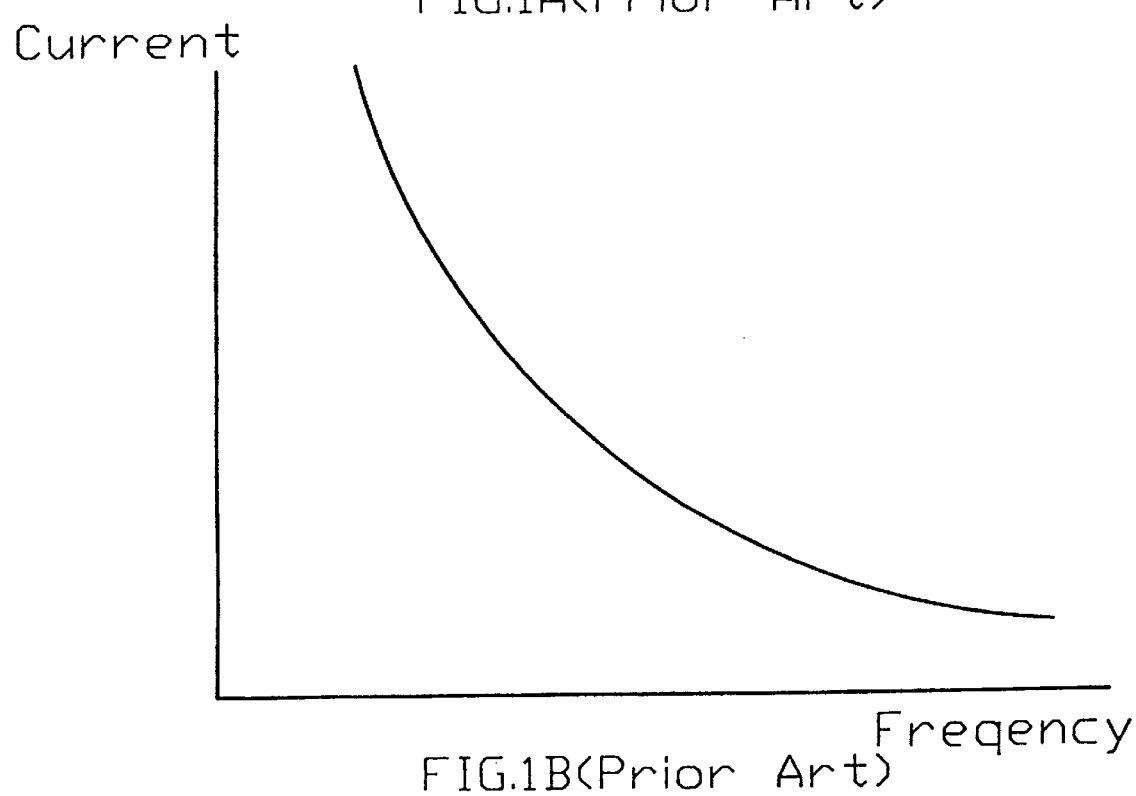
FIG. 1B illustrates a brief qualitative relationship between current and frequency of a general motor.

Referring to FIG. 2, there is shown the basic structure of the invention. Note that resistors 221 are connected in parallel to each other, and the controller 222 controls states of switches 223. Furthermore, the current control system 22 is coupled in series coupled to the power source 20 and the electric motor 21.

Figure 3:
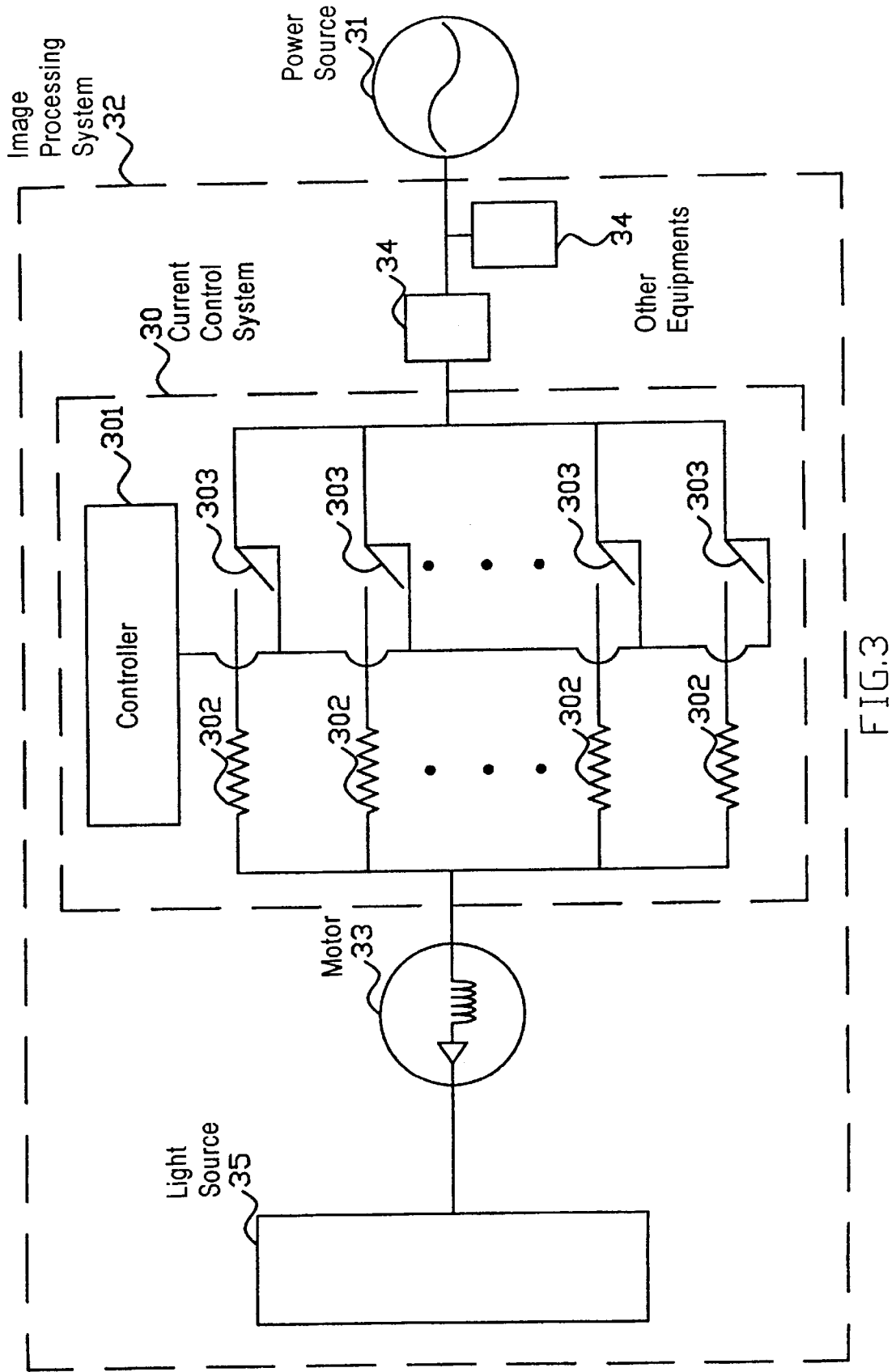
FIG. 3 shows a schematic diagram of an embodiment of the present invention.

Referring to FIG. 3, there is shown a schematic diagram of an image processing system 32 within a current control system 30 in accordance with one embodiment of the present invention. The power source 31 shown in the embodiment can be any type of power source and the motor 33 shares power source 31 with other equipment 34. After the current provided by the power source 31 is transmitted into an image processing system 32, such as a scanner, motor 33 and other elements 34 of the image processing system 32 share it. The motor 33 drives the light source 35, such as a lamp, through the scanning region and there are some different operating modes in the operating process. These modes comprise no scanning, scanning nothing, scanning different objects, and scanning same object in different sensitivities. In each mode, the required moving speed of the light source 35 is specific so that the required torque of motor 33 also is different. In order to change the torque of motor 33, the consumed current of motor 33 is varied. However, the possible effect of current variation can be controlled by connecting motor 33 to resistors 302 that are in series to motor 33 and in parallel to each other.

Referring to FIG. 3, there are a number of resistors 302 corresponding to the number of different scanning modes: no scanning, scanning nothing and scanning object with different resolutions. Which resistors 302 are used depend on the states of connected switches 303. Because in each specific working condition the number of used resistors 302 of the current control system 30 is variable, so the number of possible resistance value between motor 33 and power source 31 is larger than the number of resistors 302. These resistance values of resistors 302 are predetermined by experimental data and are chosen to let the total resistance between the motor 33 and the power source 31 be fixed in a specific range for each scanning mode, and therefore the consumed current is properly controlled.

Referring to FIG. 3, each resistor 302 connects to a switch 303 and all switches 303 connect to the same controller 301. The controller 301 accepts signals from other elements 34 of the scanner, where the signals provides the information about whether occurs, what object is to be scanned and what precision the process needs. Then it decides which resistors 302 are selected to conduct current in the existing scanning mode. The controller 301 sends signals to all switches 303 to open or close them, and some switches 303 that connect to these selected resistors 302 are turned on and current is conducted through these selected resistors 302. After these selected resistors 302 are connected to the motor 33, the total resistance value between the power source 31 and the motor 33 is adjusted. Therefore, the consumed current of the motor 33 is restricted in a specific range.

It will be appreciated that the number of resistors 302 and the resistance value of each resistor 302 are decided by the required precision of current control in the image processing system 32. If the required precision is low one resistor 302 may be enough. In the case whether motor 33 connects to resistor 302 or not corresponds to two modes: scanning nothing and scanning an object. As the required precision increases, the number of resistors 302 also is increases until each operating mode corresponds to a specific choice of resistors 302 and the net resistance value of selected resistors 302 are predetermined to adjust current.

Figure 4A:
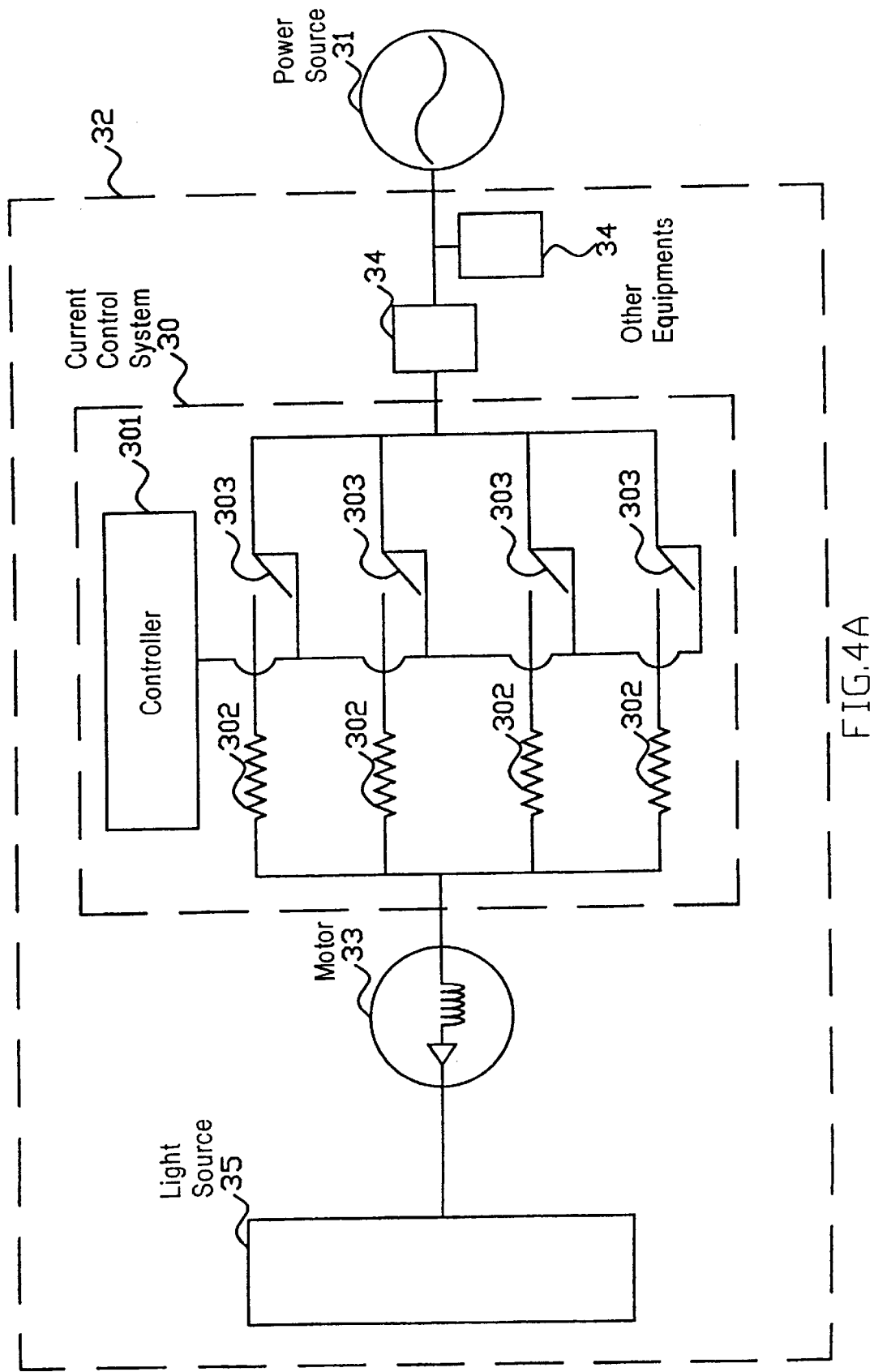
FIG. 4A shows a specific case of previous embodiment of the present invention.

Referring to FIG. 4A, a specific case of the embodiment is shown, wherein there are four resistors 302 and four switches 303. Because each time the number of selected resistors 302 may be zero, one, two, three or four, the number of possible resistance values between power source 31 and motor 33 is sixteen. The relations between the states of all switches 303 and the net resistance value of the current control system 30 are shown in FIG. 4B.

Figure 5:
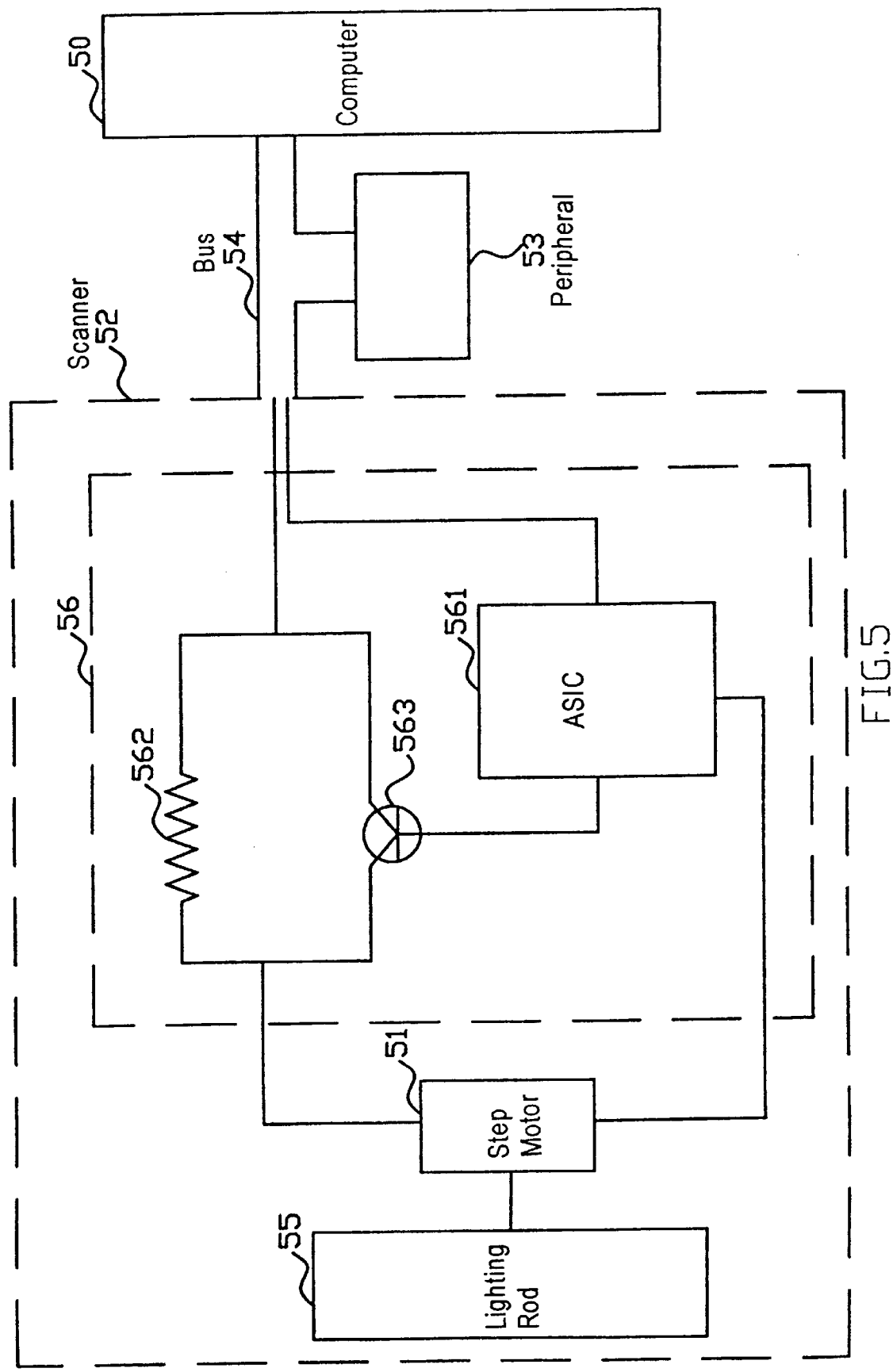
FIG. 5 shows a schematic diagram of another embodiment of the present invention.

FIG. 5 illustrates another embodiment of the present invention. A computer 50 offers power source to the scanner 52 and other peripherals 53 through the standard universal series bus (USB) 54, which offers 5 V and 500 mA current to all machines that connect through it to the computer, and wherein the power source is restricted and the motor is a step motor 51. The step motor 51 is used to precisely control the movement of lighting rod 55. The current control system 56 includes an ASIC 561, a resistor 562, and a transistor 563.

There are two scanning modes: one is scanning nothing but moving lighting source 55 through the scanning region, the another is scanning an object. The possible path of current is either through the resistor 562 or through the transistor 563. The transistor 563 is a switch and controlled by ASIC 561. The ASIC 561 also receives signals from computer 50 through the USB 54.

While the scanner 52 is operating, computer 50 sends power and signals to the scanner 52. As the program decides the present operating mode is scanning object and the required speed of the lighting rod 55 is slow, ASIC 561 sends a signal to turn on the transistor 563 and the transistor 563 is like a resistor with a negligible resistance value. Thus, the current directly flowing into motor 51 without flows through the resistor 562. As the program decides the present operating mode is scanning nothing and the required speed of lighting rod 55 is high, ASIC 561 sends another signal to turn off the transistor 563 and the transistor 563 is like a resistor with infinite resistance value. Thus, the current must flow through resistor 562 or to the motor 51. By changing the current path, both the total consumed current and the total resistance values between the motor 51 and the power source are adjusted to a fixed region. The current quantity that other equipment can also use is in a fixed region and will not vary perilously. Furthermore, the power provided by USB 54 is restricted in two limitations: the current voltage is fixed in 5 V and the total current quantity also is fixed in 500 mA. If the total resistance is too larger then the current is possiblly too small to be applied by step motor 51 to provide enough torque. In other words, the selection of resistance value must balance the two requirements: one is controlling the consumed current quantity of motor 51 and the other is providing motor 51 enough torque to drive machine.

Although specific embodiments have been illustrated and described, it will be obvious to those skilled in the art that various modifications may be made without departing from what is intended to be limited solely by the appended claims.

What is claimed is:

1. A current control system for adjusting consumed current of an electric motor, said system comprising:

a plurality of resistors connected in parallel to each other, wherein said resistors are in series coupled to said electric motor, and a resistance value of each combination of said resistors corresponds to a specified working condition of said electric motor, wherein each said combination comprises selected ones of said resistors and the resistance value of each said resistor is predetermined;

switching means for adjusting a current path through said electric motor and said plurality of resistors while maintaining a speed of said electric motor, wherein said switching means is connected to said plurality of resistors and is used to decide which of said resistors are selected into said current path, wherein said selection is made so that a predetermined optimized torgue is achieved corresponding to a specified frequency of said electric motor; and a controller for controlling said switching means, wherein on and off states of said switching means are controlled by said controller, and the operation of said controller is according to a plurality of signals it receives.

2. The system according to claim 1, wherein said plurality of signals provides information about said specified working condition of said electric motor.

3. The system according to claim 1, wherein said specified working condition of said electric motor comprises a specific operating frequency of said electric motor, a specific torque of said electric motor, a specific consumed current of said electric motor and combinations thereof.

4. An image processing system, comprising:

a step motor for driving a light source, wherein said step motor is powered by a computer;

a universal series bus configured to connect said image processing system and said computer, wherein said universal series bus transmits both a current power and a signal from said computer to said image processing system;

an application specific integrated circuit configured to receive said signal from said computer, and be used to decide a working condition of said step motor;

a transistor controlled by said application specific integrated circuit, said transistor being used to decide whether said transistor is selected into a current path; and a resistor in parallel to said transistor thereby forming two said current paths, a resistance value of said resistor being predetermined and corresponding to said working condition of said step motor.

5. The system according to claim 4, wherein said signal provides information about said working condition of said step motor.

6. The system according to claim 4, wherein said current power is about 5 volt and about 500 ma for all peripherals.

7. The system according to claim 4, wherein said working condition of said step motor comprises operating frequency of said step motor, torque of said step motor, consumed current of said step motor, and steps that said step motor needs to rotate.

8. The system according to claim 4, wherein said selection of said current path is in accordance to required torque and consumed current of said step motor.

9. A method of controlling consumed current of a motor with a limited power source, said method comprising:

receiving a signal and determining a specified working condition of a motor, wherein said signal sets an optimized torque corresponding to a specified frequency of said motor;

connecting a plurality of resistors in parallel to each other, wherein said resistors are in series coupled to said motor, and a resistance value of each combination of said resistors corresponds to a working condition of said motor, wherein each said combination comprises resistors and a resistance value of each said resistors is predetermined;

switching a plurality of switches according to said specified working condition, so that chosen resistors of said plurality of resistors are used to establish a specified current path from said power source through said plurality of resistors to said motor while maintaining said specified frequency of said motor;

adjusting a current quantity that flows through said specified current path; and powering said motor from said limit power source and then a consumed current quantity is therefore controlled.

10. A current control system to control consumed current of an electric motor, said system comprising:

a plurality of resistors connected in parallel to each other, wherein said resistors are in series coupled to said electric motor, and a resistance value of each combination of said resistors corresponds to a working condition of said electric motor, wherein each said combination comprises resistors and a resistance value of each said resistors is predetermined;

switching means for establishing a current path that corresponds to a specified working condition, wherein said current path is from a power source to said motor, and wherein said switching means is connected to said plurality of resistors and is used to decide which of said resistors are selected into said current path, wherein said selection is decided and done so that total consumed current of both said electric motor and said selected resistors is approximately constant; and a controller for controlling on and off states of said switching means and operation of said controller occurs according to a plurality of signals it receives.

11. The system according to claim 10, wherein said signals provide information about said specified working condition.

12. The system according to claim 10, wherein said working condition of said electric motor comprises an operating frequency of said electric motor, a torque of said electric motor, a consumed current of said electric motor and combination thereof.

13. The system according to claim 10, wherein said power source comprises a constant current power source.

* * * * *